Patented Aug. 19, 1924.

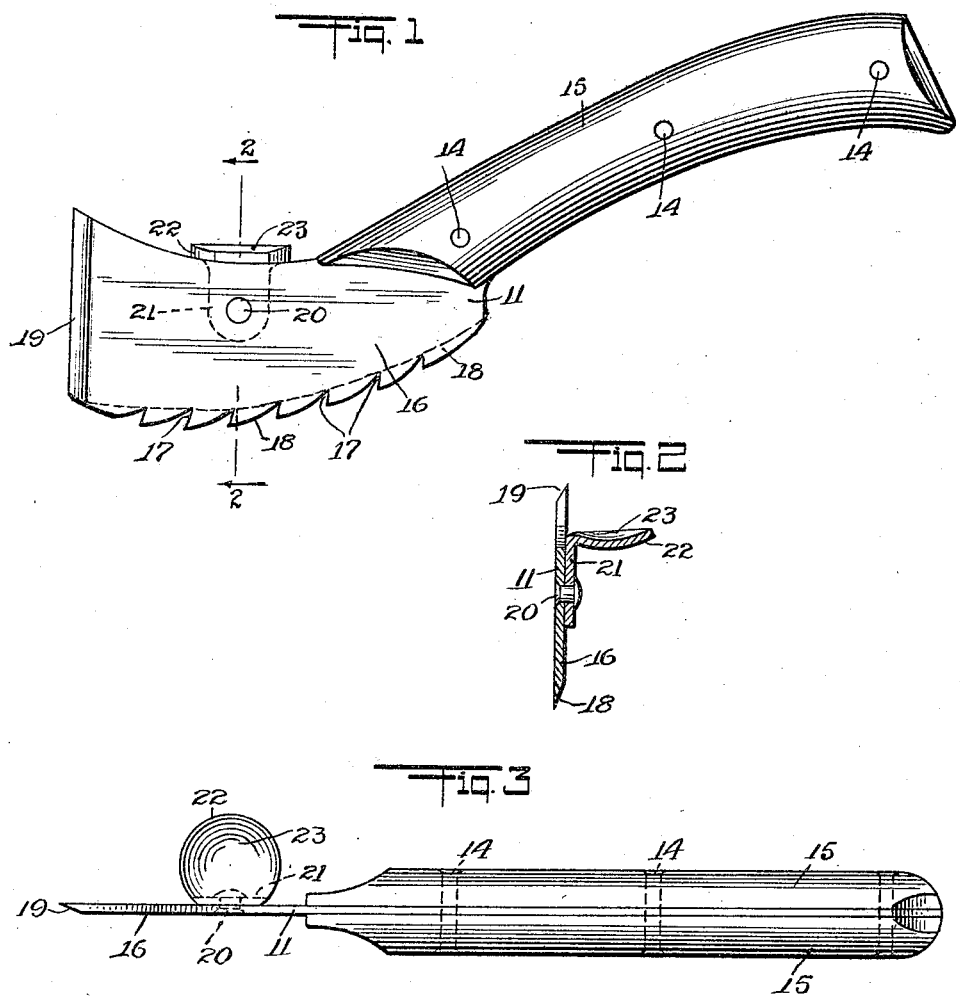

1,505,444

UNITED STATES PATENT OFFICE.

WILLIAM E. SWANSON, OF WEEHAWKEN, NEW JERSEY.

VENEER KNIFE.

Application filed November 3, 1921. Serial No. 512,445.

*To all whom it may concern:*

Be it known that I, WILLIAM E. SWANSON, a citizen of the United States, and a resident of Weehawken, in the county of Hudson and State of New Jersey, have invented certain new and useful Improvements in Veneer Knives, of which the following is a specification.

The invention relates to edged implements and particularly to the knife variety.

An object of the invention is to provide a knife for the use of upholsterers, cabinet makers and the like where the need of an implement is felt for the cutting of veneer, or other thin covering from furniture.

Another object is to provide a substantial article of the character described which can be made cheaply and in quantities and which can be readily cleaned and sharpened.

Drawings.

Figure 1 is a side elevation of the cutting implement showing the two tools combined therein.

Figure 2 is a section through the blade portion of the implement on the line 2—2 of Figure 1 showing the application thereto of a finger engaging member.

Figure 3 is a top plan view of the implement as seen in Figure 1.

Description.

The cutting implement denoted generally by 10 consists mainly of a blade 11, elongated as at 12 to form a portion of the handle 13. Attached as by rivets 14 to the side of the elongated position 12 of the blade are the grips 15 which may be constructed of wood or bone, the rivets therein being countersunk to present a smooth surface to the hand of the user.

The lower edge 16 of the blade proper is serrated as at 17 to form a series of small sharpened cutting edges 18. The lower edge of the blade is also curved, the reason for which will be hereinafter explained.

The front edge of the blade which is formed substantially square to the blade proper is sharpened to form the knife-edge 19. The top edge of the blade is curved upwardly from the lower edge of the handle so that the front knife edge 19 will be as long as possible without making the whole implement unwieldy.

Attached to the center upper portion of the blade as with the rivet 20 is the finger piece 21, the finger engaging portion 22 thereof being cupped as at 23 and bent at substantially right angles to the blade.

The handle is slightly curved, so that proper purchase may be obtained in using the implement. The finger piece is engaged preferably by the forefinger or thumb and being cupped prevents the finger from slipping thereoff.

In use, the serrated edge of the implement is drawn across the veneer or material to be cut and is given a slow rocking motion so that all of the serrations will successively perform a cutting operation, thereby insuring a clean positive cutting of the material.

The end knife edge 19 can then be used for raising the veneer from the surface of the woodwork by insertion under the cut edge thereof.

Claims.

1. An implement as characterized, comprising a blade formed to provide an outwardly curved side cutting edge at one side of the transverse center thereof, a straight end cutting edge disposed in right angular relation to the longitudinal center of said blade and at the outer end of said curved side cutting edge, and a handle portion curved on a line reversed to the curvature of the said side cutting edge, said side cutting edge being toothed throughout its length, hand gripping members secured at the opposite sides of said handle portion, and a finger piece secured on one side of the cutting portion of the blade.

2. An implement as characterized, comprising a blade formed to provide an outwardly curved side cutting edge at one side of the transverse center thereof, a straight end cutting edge disposed in right angular relation to the longitudinal center of said blade and at the outer end of said curved side cutting edge, and a handle portion curved on a line reversed to the curvature of the said side cutting edge, said side cutting edge being toothed throughout its length, hand gripping members secured at the opposite sides of said handle portion, and a finger piece secured on one side of the cutting portion of the blade and having its finger engaging portion disposed at right angles to and in the plane of the side edge thereof opposite to the curved side cutting edge of the same.

3. An implement as characterized, comprising a blade formed to provide an elongated outwardly curved side cutting edge, a straight cutting edge disposed at the outer end of said blade and in right-angular relation to the major axis thereof, and a handle portion curved on a line reversed to the curvature of said outwardly curved cutting edge, said side cutting edge being formed to provide a plurality of teeth having straight forward edges extending in planes, one parallel to the other and transversely of the blade and having their outer edges curved rearwardly and inwardly to the inner ends of the said straight edges thereof, and hand gripping members secured at the opposite sides of said handle portion.

WILLIAM E. SWANSON.